US011055407B2

(12) United States Patent
Herwadkar et al.

(10) Patent No.: US 11,055,407 B2
(45) Date of Patent: Jul. 6, 2021

(54) DISTRIBUTION-BASED ANALYSIS OF QUERIES FOR ANOMALY DETECTION WITH ADAPTIVE THRESHOLDING

(71) Applicant: Oracle International Corporation, Redwood Shores, CA (US)

(72) Inventors: Rahul V Herwadkar, Foster City, CA (US); Joydip Kundu, Nashua, NH (US); Anindya Chandra Patthak, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 211 days.

(21) Appl. No.: 16/143,239

(22) Filed: Sep. 26, 2018

(65) Prior Publication Data

US 2019/0102553 A1 Apr. 4, 2019

Related U.S. Application Data

(63) Continuation-in-part of application No. 15/721,790, filed on Sep. 30, 2017, now Pat. No. 10,621,180.

(51) Int. Cl.
*G06F 7/02* (2006.01)
*G06F 16/00* (2019.01)
(Continued)

(52) U.S. Cl.
CPC .......... *G06F 21/566* (2013.01); *G06F 16/245* (2019.01); *G06F 21/552* (2013.01);
(Continued)

(58) Field of Classification Search
CPC ...... G06N 20/00; G06N 7/005; G06F 16/245; G06F 16/2458; G06F 21/6218;
(Continued)

(56) References Cited

U.S. PATENT DOCUMENTS

| 7,774,361 B1 * | 8/2010 | Nachenberg | .......... G06F 21/552 707/779 |
| 2011/0271146 A1 | 11/2011 | Mork et al. | |

(Continued)

FOREIGN PATENT DOCUMENTS

CN 107644162 * 1/2013 ............. G06F 21/55

OTHER PUBLICATIONS

Kreugel, Christopher et al, "Anomaly Detection of Web-based Attacks," Conference on Computer Communications and Security Oct. 2003. (Year: 2003).*
Kamra, Ashish et al, "Detecting anomalous access patterns in relational databases," International Journal on Very Large Databases 2007. (Year: 2007).*

*Primary Examiner* — Bruce M Moser
(74) *Attorney, Agent, or Firm* — Invoke

(57) ABSTRACT

Techniques for detecting an anomaly in queries of a relational database are disclosed. The techniques include identifying a set of attribute values from a query for accessing data within a database. Based on previously received queries, at least one of a joint probability for the set of attribute values or individual probabilities for the set of attribute values is determined. When at least one of the joint probability for the set of attribute values or an individual probability for one or more attribute values in the set of attribute values does not satisfy a probability cutoff, an indication that the query is anomalous is outputted.

23 Claims, 11 Drawing Sheets

(51) Int. Cl.
*G06F 21/56* (2013.01)
*G06F 21/62* (2013.01)
*G06N 7/00* (2006.01)
*G06F 16/245* (2019.01)
*G06F 21/55* (2013.01)

(52) U.S. Cl.
CPC ........ *G06F 21/554* (2013.01); *G06F 21/6218* (2013.01); *G06N 7/005* (2013.01); *G06F 2221/032* (2013.01)

(58) Field of Classification Search
CPC ...... G06F 21/566; G06F 21/552; G06F 17/18; G06F 2221/032
See application file for complete search history.

(56) References Cited

U.S. PATENT DOCUMENTS

| | | |
|---|---|---|
| 2012/0041901 A1 | 2/2012 | Zhao et al. |
| 2015/0286819 A1 | 10/2015 | Coden et al. |
| 2016/0239536 A1 | 8/2016 | Honma et al. |
| 2017/0078324 A1* | 3/2017 | Bordawekar ....... H04L 63/1408 |
| 2017/0126718 A1* | 5/2017 | Baradaran ........... H04L 63/0281 |
| 2017/0345052 A1* | 11/2017 | Barford ................... H04L 43/10 |
| 2018/0260447 A1 | 9/2018 | Bergman et al. |
| 2018/0276566 A1* | 9/2018 | Zhang ....................... C07F 7/28 |
| 2020/0067948 A1* | 2/2020 | Baradaran ........... H04L 63/1441 |
| 2021/0067533 A1* | 3/2021 | Zhou ................... H04L 67/146 |

* cited by examiner

DISTRIBUTION-BASED ANALYSIS OF QUERIES FOR ANOMALY DETECTION WITH ADAPTIVE THRESHOLDING

BENEFIT CLAIMS; RELATED APPLICATIONS; INCORPORATION BY REFERENCE

This application is a continuation-in-part of U.S. application Ser. No. 15/721,790, filed Sep. 30, 2017, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to relational databases. In particular, the present disclosure relates to techniques for performing attribute-based detection of anomalous relational database queries.

BACKGROUND

Relational database management systems (RDBMS) typically interface with applications using a dialect of Structured Query Language (SQL). For example, an application may use SQL as a data manipulation language (DML) for adding, deleting, selecting, and/or updating records in a relational database. The application may also use SQL as a data definition language (DDL), which enables the creation, update, and deletion of tables and/or columns in the relational database. Because both DML and DDL queries can be used by malicious users to access and/or manipulate sensitive information, relational database security may be improved by detecting and responding to anomalous relational database queries that do not conform to common or legitimate database access patterns.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
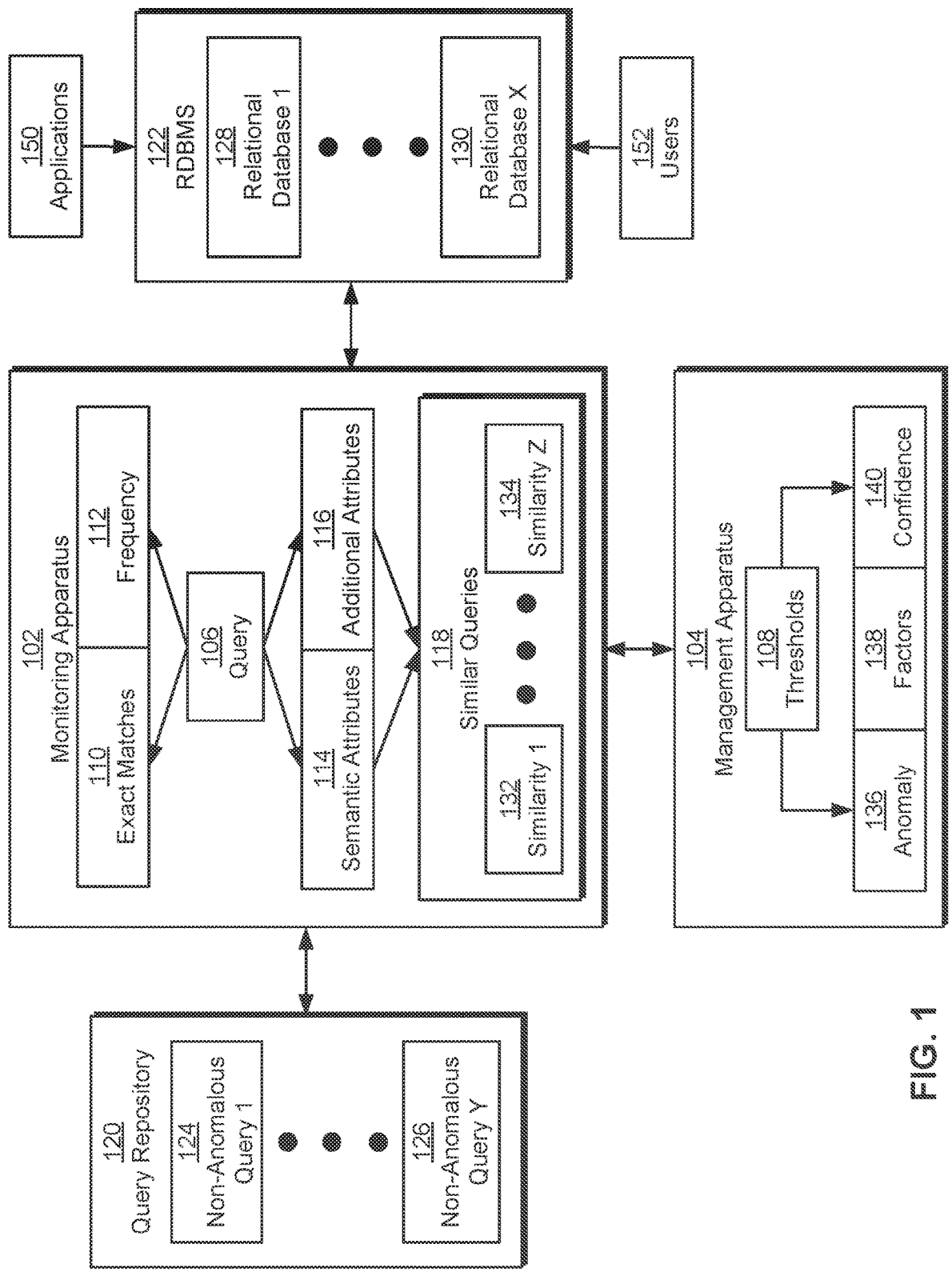
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. DETECTING ANOMALIES IN RELATIONAL DATABASE QUERIES
4. EXAMPLE EMBODIMENT
5. FREQUENCY-BASED ANOMALY DETECTION IN RELATIONAL DATABASE QUERIES
6. ATTRIBUTE-BASED ANOMALY DETECTION IN RELATIONAL DATABASE QUERIES
7. DISTRIBUTION MODEL TRAINING
8. DISTRIBUTION MODEL EVALUATION
9. ADAPTIVE THRESHOLDING AND RESPONSIVE ACTIONS
10. HISTOGRAM-BASED ANOMALY DETECTION EXAMPLE
11. COMPUTER NETWORKS AND CLOUD NETWORKS
12. MISCELLANEOUS; EXTENSIONS
13. HARDWARE OVERVIEW

1. GENERAL OVERVIEW

Techniques for detecting anomalies in queries are disclosed. In some embodiments, the techniques include generating distribution models, such as histogram distributions, to profile overall user behavior and query patterns. The distribution models may be trained using unsupervised machine learning processes, allowing anomalous behavior to be automatically learned during runtime with little to no input from a human user. The techniques allow for insights to be gained into anomalous behavior that would not otherwise be readily apparent to a system administrator or other users overseeing system security. The techniques further provide a scalable solution in large and complex environments, where a significant number of queries may be evaluated in sub-second time.

In some embodiments, an anomaly detection process includes a training phase during which one or more distribution models are trained based on varying attribute values for a set of feature attributes extracted from a set of received queries. The set of feature attributes that are used to train the distribution models may include semantic and/or non-semantic query attributes. A semantic attribute is an attribute relating to a meaning in the query language or query logic. Semantic attributes may include, but are not limited to, query statements/commands (e.g., SELECT, CREATE, and other commands), logical operators (e.g., AND, OR, XOR, etc.), mathematical operators ("+", "−", etc.), query expressions (e.g., any part of a query expressed in a query syntax), expression ordering (e.g., where one expression is located relative to other expressions in the query), and object references (e.g., table names, file names, column identifiers, etc.). Non-semantic attributes may include any other attribute of the query that is not semantic. Example non-semantic attributes may include, but are not limited to, the time, day, and/or month that the query was submitted; the user performing the query; one or more privileges associated with the user; and/or an application, Internet Protocol (IP) address, and/or host from which the query originated.

In some embodiments, a set of trained distribution models are evaluated against newly received queries to detect anomalies. The trained set of distribution models may capture probability distributions for various query attributes detected within previously received queries used to train the models. During the evaluation phase, a set of attribute values may be extracted from a newly received query. The set of attribute values may then be compared to the probability distributions captured in the trained models to determine individual probabilities for each attribute value and/or a joint probability for the set of attribute values. If one or more of the probabilities does not satisfy a probability cutoff, then the anomaly detection system may output an indication that the query is anomalous.

In some embodiments, the distribution models provide adaptive learning of query patterns. New features may be quickly added to the analysis by constructing a new histogram distribution during runtime. Additionally or alternatively, white list content may be detected and brought to the attention of a user. White list content refers to patterns not seen previously, which may begin as outliers. These patterns may then automatically transition to normal patterns after the histogram frequency exceeds a probability cutoff. A user may be alerted when the transition occurs and may override the transition at any point in time.

In some embodiments, the anomaly detection system is configured to perform one or more responsive actions when an anomalous query is detected. In some cases, a summary may be generated that describes what attributes of the query are anomalous. The summary may highlight where the attribute value for the anomalous attribute falls within a distribution. Additionally or alternatively, the anomaly detection system may suspend or otherwise block execution of the anomalous query. A system administrator may be presented with an option to allow or deny execution of the query.

In some embodiments, the anomaly detection system is configured to provide adaptive thresholding whereby one or more probability thresholds may be adjusted to increase or reduce how many queries are classified as anomalous. For example, the probability cutoff may be adjusted to reduce the number of queries that are classified as anomalous. As a result, less alerts are generated, and the number of false positives may be reduced. This allows system administrators to focus bandwidth on queries that have the highest level of risk. The probability cutoff may also be adjusted to cast a wider net and classify a greater number of queries as anomalous.

One or more embodiments described in this Specification and/or recited in the claims may not be included in this General Overview section.

2. ARCHITECTURAL OVERVIEW

FIG. 1 illustrates an anomaly detection system in accordance with one or more embodiments. As illustrated in FIG. 1, the system includes a monitoring apparatus 102 and a management apparatus 104.

Monitoring apparatus 102 and management apparatus 104 may be used to detect anomalies in queries of one or more relational databases (e.g., relational database 1 128, relational database x 130) that are managed and/or maintained using a relational database management system (RDBMS) 122. For example, RDBMS 122 may allow applications 150 and/or users 152 to create, modify, define, and/or update the relational databases using Structured Query Language (SQL) queries.

Monitoring apparatus 102 may analyze a given query 106 received by RDBMS 122 for an anomaly 136 by comparing query 106 to a set of non-anomalous queries (e.g., non-anomalous query 1 124, non-anomalous query y 126) in a query repository 120. For example, the non-anomalous queries may include historic queries that are generated during normal use of RDBMS 122 by applications 150 and/or users 152. The non-anomalous queries may also, or instead, include a whitelist of legitimate queries provided by a developer and/or administrator associated with RDBMS 122. The non-anomalous queries may be aggregated from RDBMS 122, applications 150, and/or users 152 and stored in a database, data warehouse, filesystem, cloud storage, and/or another data-storage mechanism provided by query repository 120 for subsequent retrieval and use.

In turn, management apparatus 104 may generate output related to anomalies in relational database queries that are detected by monitoring apparatus 102. For example, management apparatus 104 may generate notifications, alerts, log files, and/or other output indicating anomalies (e.g., anomaly 136) in queries (e.g., query 106) of RDMBS 122. Management apparatus 104 may also include one or more factors 136 associated with identifying the query as anomalous and/or a confidence 136 in identifying the query as anomalous.

In one or more embodiments, the system may include more or fewer components than the components illustrated in FIG. 1. For example, monitoring apparatus 102 and management apparatus 104 may be implemented together and/or separately using one or more hardware and/or software components. Such components may include, but are not limited to, relational database audit logs, session histories, application servers, database firewalls, and/or other mechanisms for analyzing relational database queries on a real-time, near-real-time, and/or offline basis. Such components may be local to or remote from each other, implemented in software and/or hardware, and/or distributed over multiple applications and/or machines. Multiple components may also be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository is any type of physical or virtual storage unit and/or device (e.g., a filesystem, database, collection of tables, or any other storage mechanism) for storing data. For example, the data repository may include query repository 120 and/or RDBMS 22. Further, the data repository may include multiple different storage units and/or devices. The multiple different storage units and/or devices may or may not be of the same type or located at the same physical site. The data repository may be implemented or may execute on the same computing system as monitoring apparatus 102 and/or management apparatus 104 or on a computing system that is separate from monitoring apparatus 102 and/or management apparatus 104. The data repository may be communicatively coupled to monitoring apparatus 102 and/or management apparatus 104 via a direct connection or via a network.

In one or more embodiments, monitoring apparatus 102 and/or management apparatus 104 include hardware and/or software configured to perform operations described herein for detecting anomalies in relational database queries. Examples of such operations are described below.

In an embodiment, the system of FIG. 1 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. DETECTING ANOMALIES IN RELATIONAL DATABASE QUERIES

In one or more embodiments, the system of FIG. 1 includes functionality to perform attribute-based detection of anomalous relational database queries. As mentioned above, monitoring apparatus 102 may compare a given query 106 to a number of non-anomalous queries in query repository 120 to determine if query 106 contains anomaly 136 or not.

As shown in FIG. 1, the comparisons may include identifying exact matches 110 between query 106 and the non-anomalous queries. For example, monitoring apparatus 102 may calculate a checksum, message digest, and/or hash value from query 106 and compare the calculated value with corresponding values calculated from non-anomalous queries in query repository 120. If the calculated value matches one or more corresponding values, one or more exact matches 110 may be found between query 106 and the non-anomalous queries. In other words, monitoring apparatus 102 may identify exact matches 110 when the syntax of query 106 exactly matches that of one or more non-anomalous queries.

If exact matches 110 are found between query 106 and the non-anomalous queries, monitoring apparatus 102 may determine a frequency 112 associated with exact matches 110. For example, monitoring apparatus 102 may obtain frequency 112 as the number of exact matches 110 found for query 106 and/or the number of times query 106 has been made over a given period (e.g., a week, a month, a year, the beginning of time, etc.).

To determine if a recurring query 106 (e.g., a query that has exact matches 110) is anomalous, monitoring apparatus 102, management apparatus 104, and/or another component of the system may compare frequency 112 to one or more thresholds 108 associated with frequency 112. The comparison may be performed to determine if query 106 is frequent enough to be considered non-anomalous. For example, the component may calculate a percentile associated with frequency 112 based on a distribution of query frequencies for one or more relational databases in RDBMS 122. If the percentile does not meet a threshold (e.g., if the percentile represents the lowest 1-2% of query frequencies), the component may determine that query 106 contains anomaly 136. If the percentile meets the threshold, the component may determine that query 106 is not anomalous. In another example, the component may compare frequency 112 with a threshold representing a minimum number of occurrences of a query. If frequency falls below the threshold, the component may identify query 106 as non-anomalous.

If exact matches 110 are not found between query 106 and any non-anomalous queries, monitoring apparatus 102 may compare semantic attributes 114 and/or additional attributes 116 of query 106 with those of the non-anomalous queries. Semantic attributes 114 may include coarse-grained semantic features of query 106. For example, semantic attributes 114 for data manipulation language (DML) queries of RDBMS 122 may include database instances, tables, columns, and/or query options (e.g., a select all option.) in the queries. In another example, semantic attributes 114 for data definition language (DDL) queries of RDBMS 122 may include database instances, users, roles, privileges, and/or grant options (e.g., a grant all privileges option, a "with admin" option, etc.) in the queries. In other words, semantic attributes 114 may capture the intended effect of query 106, independently of the structure or syntax of query 106.

Additional attributes 116 may describe the context in which query 106 is executed. For example, additional attributes 116 may identify a time of query 106, a source of query 106 (e.g., application, host, network address, etc.), a user performing query 106, and/or one or more privileges associated with the user.

Monitoring apparatus 102 may use semantic attributes 114 and/or additional attributes 116 to identify, from a larger set of non-anomalous queries in query repository 120, a set of similar queries 118 to query 106. For example, monitoring apparatus 102 may use a locality-sensitive hashing technique to match query 106 to a subset of non-anomalous queries with similar semantic attributes 114 and/or additional attributes 116. If query 106 does not have any similar queries 118, monitoring apparatus 102 may identify anomaly 136 in query 106.

If similar queries 118 are found for query 106, monitoring apparatus 102 may calculate a similarity (e.g., similarity 1 132, similarity z 134) between query 106 and each similar query. For example, monitoring apparatus 102 may use vector representations of semantic attributes 114 and/or additional attributes 116 to calculate a Euclidean distance, cosine similarity, Hamming distance, and/or other measure of similarity between query 106 and each query in similar queries 118. Identifying similar queries 118 and calculating similarities between query 106 and similar queries 118 is described in further detail below with respect to FIG. 2.

After similarities are calculated between query 106 and similar queries 118, monitoring apparatus 102, management apparatus 104, and/or another component of the system may compare the similarities to one or more thresholds 108 to determine if query 106 is anomalous or not. For example, the component may compare the highest similarity found between query 106 and a similar query to a similarity threshold. If the highest similarity does not meet the similarity threshold (i.e., if query 106 is not similar enough to any non-anomalous queries), the component may set a flag and/or generate other output indicating anomaly 136 in query 106. If the highest similarity meets the similarity threshold, the component may determine that query 106 is not anomalous.

The component may also include frequency 112 in the detection of anomaly 136 based on a comparison of query 106 with similar queries 118. For example, frequency 112 may be obtained from one or more similar queries 118 (e.g., one or more of the most similar queries) and used to adjust thresholds 108. As a result, one or more similar queries with high frequency 112 may be used to lower the similarity threshold and/or another threshold used to detect anomaly 136, while multiple similar queries with low frequency 112 may cause an increase in the threshold(s). Query 106 may thus be identified as non-anomalous if one or more similar queries have sufficiently high frequency 112 and as anomalous if all highly similar queries 118 are low frequency 112. In other words, the system may use multidimensional attributes (e.g., similarity, frequency 112, etc.) to perform anomaly detection in queries of RDBMS 122.

When a given query 106 is identified as anomalous, management apparatus 104 may output an indication of anomaly 136 for query 106. For example, management apparatus 104 may generate an email, notification, alert, message, log entry, and/or other communication or output containing the indication. The output may be provided and/or transmitted to an administrator, developer, and/or other user associated with monitoring and managing queries and/or anomalies in RDBMS 122.

Management apparatus 104 may also output one or more factors 138 associated with anomaly 136. For example, management apparatus 104 may identify differences between attributes (e.g., semantic attributes 114 and/or additional attributes 116) of query 106 and those of non-anomalous queries as factors 138 contributing to the identification of anomaly 136 in query 106. In another example, management apparatus 104 may identify a low frequency 112 as the reason for identifying anomaly 136 in a recurring query 106.

Management apparatus 104 may additionally output a confidence 140 associated with identifying anomaly 136 in query 106. For example, management apparatus 104 and/or another component of the system may calculate a confidence score based on the amount by which a given threshold (e.g., frequency threshold, similarity threshold, etc.) is not met by query 106. The confidence score may be included with the outputted indication of anomaly 136 and/or factors 138 to further facilitate assessment and/or management of anomalous relational database queries.

Management apparatus 104 and/or another component of the system may perform additional actions based on anomaly 136, factors 138, and/or confidence 140. For example, the component may block execution of an anomalous query if confidence 140 exceeds a threshold and/or the query is used to access sensitive data or make significant and/or unusual changes to database tables, instances, and/or privileges. In another example, the component may obtain user feedback related to queries identified as anomalous by the system. The user feedback may identify non-anomalous queries that were previously identified as anomalous by the system. In turn, the identified queries may be used to populate a whitelist, and any subsequent queries that e 111 are found in the whitelist may be omitted from notifications and/or other output related to anomalous queries to RDBMS 122.

By performing initial anomaly detection based on exact matches 110 and frequency 112, the system of FIG. 1 may quickly omit common, non-anomalous queries from further analysis while flagging infrequent queries that can be legitimate but should still be considered sensitive or noteworthy. For example, the component may flag, as anomalous, infrequent queries that retrieve version information from RDBMS 122, even if such queries are occasionally performed by applications 150 for legitimate reasons.

Subsequent analysis of similarities in semantic attributes 114 and/or additional attributes 116 between queries and similar queries 118 may further allow the system to identify anomalies in a more flexible and/or adaptive manner than conventional techniques that perform anomaly detection using user-written rules and/or syntax-based query analysis. For example, the system may avoid identifying a query as anomalous when the query produces the same effect as a non-anomalous query but has a slightly different syntax (e.g., to improve performance). On the other hand, the query may be incorrectly flagged as anomalous by a syntax-based anomaly detection technique (e.g., because the query differs in syntax from the non-anomalous query) and/or a rules-based anomaly detection technique (e.g., because the rules do not describe all possible correct access paths to RDBMS 122). Consequently, the system of FIG. 1 may improve the use of relational databases and the detection of anomalous queries of relational databases.

4. EXAMPLE EMBODIMENT

A detailed example is described below for purposes of clarity. Components and/or operations described below should be understood as one specific example, which may not be applicable to certain embodiments. Accordingly, components and/or operations described below should not be construed as limiting the scope of any of the claims.

Figure 2:
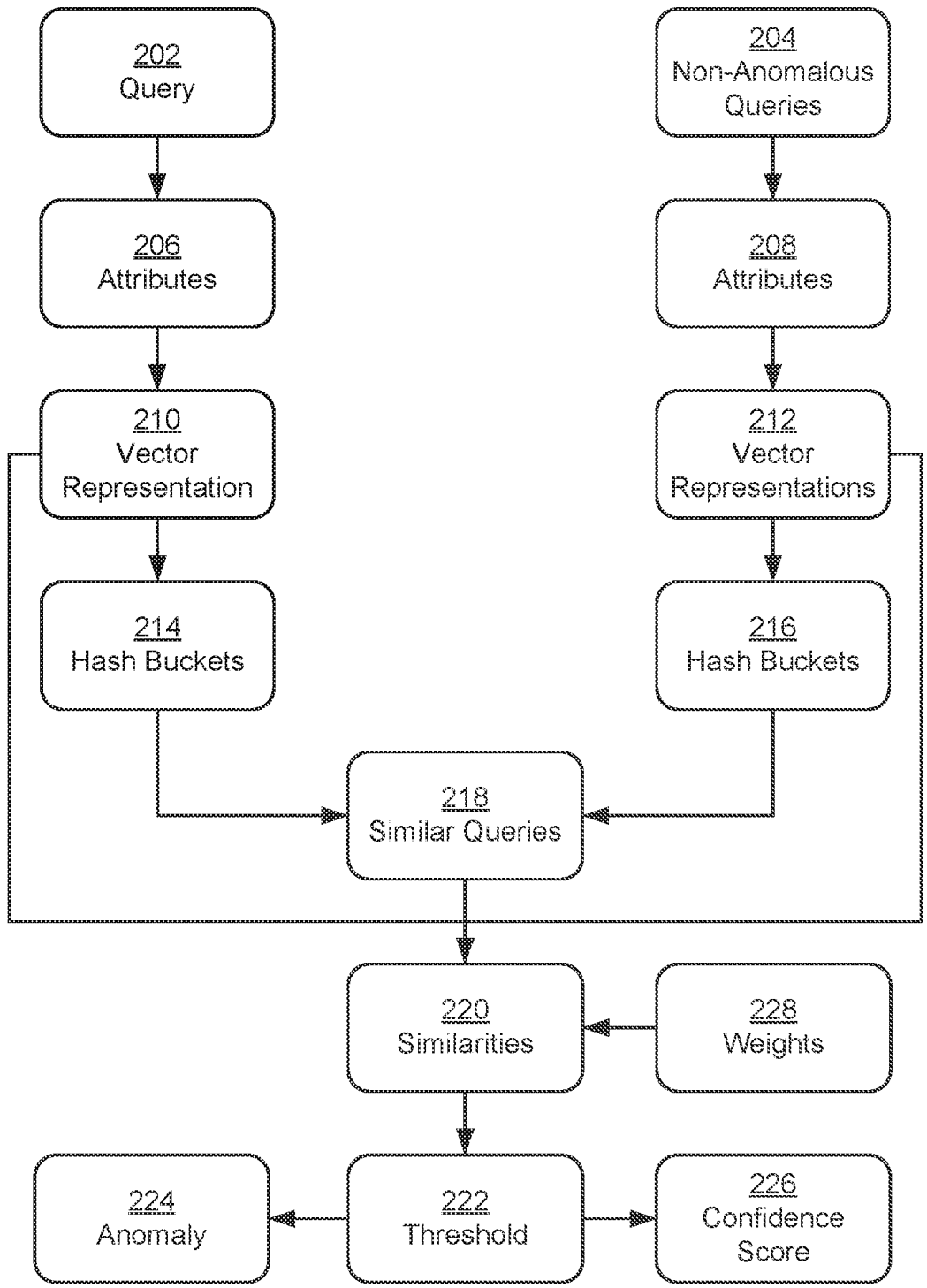
FIG. 2 illustrates an exemplary detection of an anomaly in a relational database query in accordance with one or more embodiments.

FIG. 2 illustrates an exemplary detection of an anomaly 224 in a relational database query 202 in accordance with one or more embodiments. More specifically, FIG. 2 shows an exemplary technique for performing attribute-based detection of anomaly 224 in query 202.

As mentioned above, attribute-based detection of anomaly 224 may be performed after query 202 fails to exactly match any non-anomalous queries. As a result, query 202 may be compared to a "positive" set of non-anomalous queries 204 based on similarities 220 between attributes 206-208 of the queries, which may include semantic attributes and/or additional non-semantic attributes.

For example, a DML query may be parsed to extract one or more of the following semantic attributes:
  a query type;
  table names in the query;
  column names selected in the query;
  column names subject to "WHERE" clauses in the query;
  a Boolean indicating if a "select all" option (e.g., "SELECT *" in SQL) is used in the query; and
  the number of tokens (e.g., words) in the query.
An exemplary DML query may have the following form:
  SELECT J.JO_ID, TARGET_LIST_INDEX, E.JOB_TYPE_ID FROM MGMT_JOB_EXEC_SUMMARY E, MGMT_JOB J WHERE EXECUTION_ID=:B1 AND J.JOB_ID=E.JOB_ID In turn, the following attributes may be extracted from the exemplary DML query:
  query type: SELECT
  tables: {MGMT_JOB, MGMT_JOB_EXEC_SUMMARY}
  selected columns: {J.JOB_ID, TARGET_LIST_INDEX E.JOB_TYPE_ID}
  columns subject to "WHERE" clauses: {EXECUTION_ID, J.JOB_ID, E.JOB_ID}
  "select all" option: FALSE
  number of tokens: 15

In another example, a DDL query may be parsed to extract one or more of the following attributes:
  a query type;
  users, roles, or other grantees in the query;
  privileges granted in the query;
  a Boolean indicating if a "grant" query is issued with "all privileges" option; and
  a Boolean indicating if a "grant" query is issued with a "with admin" option.

An exemplary DDL query may have the following form:
  GRANT ALTER DATABASE TO dw_manager WITH ADMIN OPTION As a result, the following attributes may be extracted from the exemplary DDL query:
  query type: GRANT
  grantees: {dw_manager}
  privileges: {ALTER}
  "all privileges" option: FALSE
  "with admin" option: TRUE In both examples, semantic attributes extracted from the queries may be accompanied by additional non-semantic attributes. For example, one or both queries may include attributes such as the time, day, and/or month of the query; the user performing the query; one or more privileges associated with the user; and/or an application, Internet Protocol (IP) address, and/or host from which the query originated.

Next, attributes 206 of query 202 may be converted into a vector representation 210, and attributes 208 of non-anomalous queries 206 may be converted into a set of vector representations 212. For example, a dictionary may be used to map between strings representing attributes 206-208 to numeric (e.g., integer) encodings of the strings, and an encoded numeric value representing each attribute may be included in a vector representation of the corresponding query.

Thus, exemplary attributes of a DML query above may be encoded into a vector representation that contains the following:
  one element representing the query type;
  one or more elements representing table names in the query, up to an optional pre-specified limit;
  one or more elements representing column names selected in the query, up to an optional pre-specified limit;
  one or more elements representing column names subject to "WHERE" clauses in the query, up to an optional pre-specified limit;
  one element (e.g., a Boolean) indicating if a "select all" option (e.g., "SELECT *" in SQL) is used in the query; and
  one element indicating the number of tokens (e.g., words) in the query.

Similarly, exemplary attributes of a DDL query may be encoded into a vector representation that contains the following:
  one element representing the query type;
  one or more elements representing users, roles, or other grantees, up to an optional pre-specified limit;
  one or more elements representing privileges granted in the query, up to an optional pre-specified limit;
  one element (e.g., a Boolean) indicating if a "grant" query is issued with "all privileges" option; and
  one element (e.g., a Boolean) indicating if a "grant" query is issued with a "with admin" option.

Vector representation 210 may then be mapped to one or more hash buckets 214, which are compared to hash buckets 216 to which vector representations 212 are mapped. For example, a locality-sensitive hashing technique may be used to map vector representations 212 of attributes 208 to a set of hash buckets 216 using the following exemplary pseudocode:

```
Input: A set of (integer) vectors P = {p} in d dimensions
Output: Hash tables T1,...,Tk
  1. For each hash table T1, ..., Tk, generate a set of size n random
     hyperplanes in d dimensions
  2. For each i in 1, ..., k,
     a. For each j in 1, ..., n and for each p in P
        Get an n bit integer t by taking dot product of p and jth
        hyperplane
     b. Store point p in bucket t of Ti
```

In the above pseudocode, input vectors "P" represent vector representations 212 of fixed dimension "d" that are mapped and stored in hash buckets 216 of "k" hash tables. Each hash bucket for a given hash table may be identified using an "n" bit integer, with each bit "j" in the integer representing the sign (e.g., positive or non-positive) of the dot product of a given vector representation "p" in "P" with the "jth" hyperplane. After query 202 is received, the same hyperplanes may be used to map vector representation 210 of attributes 206 to a different set of hash buckets 214, which may be a subset of hash buckets 216.

Overlap between hash buckets 214 and hash buckets 216 may then be used to identify, from a larger set of non-anomalous queries 206, a set of similar queries 218 to query 202. Continuing with the previous example, a subset of vector representations 212 representing similar queries 218 may be obtained from hash buckets 214 to which vector representation 210 maps using the following exemplary pseudocode:

```
Input: A query (integer) vector q in d dimensions
Output: k (=1) nearest neighbor to q or nil if there in none
  0. S <- emptySet;
  1. For each i in 1,..k,
     a. S <-S U bucket t in Ti, where t is the n-bit integer by taking
        dot product of q and set of hyperplanes
     b. Return the k closest neighbors of q from set S
```

In the above pseudocode, an input vector "q" denotes vector representation 210 of the same dimension "d" as vector representations 212. The same set of random hyperplanes used to populate hash buckets 216 in "k" hash tables may be combined with "q" to identify a set S of hash buckets 214 in the same hash tables and obtain one or more vector representations 212 in the identified hash buckets 214. If all hash buckets 214 are empty, no similar queries 218 may be found for query 202.

In another example, a set of random linear transformations may be applied to variable-length vector representations 212 of attributes 208 (e.g., queries with different numbers of tables, columns, grantees, privileges, etc.) to generate a constant dimensional signature for each of non-anomalous queries 204. The constant dimensional signatures of non-anomalous queries 204 may be used as input to hash functions that map the queries into one or more hash buckets 216, and vector representations 212 of non-anomalous queries 204 may be stored in the corresponding hash bucket(s). After query 202 is received, the same transformations may be applied to vector representation 210 to generate a signature that is used to identify one or more hash buckets 214 to which vector representation 210 maps and obtain zero or more vector representations 212 of similar queries 218 from hash buckets 214.

After similar queries 218 are identified, vector representation 210 may be compared to the subset of vector representations 212 for similar queries 218 to calculate a set of similarities 220 between query 202 and similar queries 218. For example, each element of vector representation 210 may be compared with a corresponding element in a vector representation for a similar query. If the elements are the same, a corresponding element of an output vector may be set to 0. If the elements differ, the corresponding element may be set to 1. In another example, a cosine similarity, Jaccard similarity, Euclidean distance, and/or another measure of similarity between two vectors and/or sets.

A set of weights 228 may additionally be applied to the compared vector representations to calculate similarities 220. Each weight may represent the relative importance of the corresponding vector element and/or attribute in detecting anomaly 224 in query 202. For example, a weight for a table name may be higher than a weight for a column name to reflect the higher risk associated with accessing a new table instead of a new column in a previously accessed table. Thus, a weight vector of <10, 20, 30, 10> may be applied to two four-dimensional vectors of <2, 3, 4, 5> and <2, 7, 5, 5> to obtain a similarity of 10*0+20*1+30*1+10*0, or 50.

A threshold 222 is then applied to similarities 220 to determine if anomaly 224 is found in query 202 and/or calculate a confidence score 226 associated with a detected anomaly 224 in query 202. For example, similarities 220 may be compared to a similarity threshold 222 to determine if query 202 differs enough from non-anomalous queries 204 to be anomalous. If similarity threshold 222 is met by one or more similarities 220 (e.g., if query 202 is similar enough to one or more similar queries 218), anomaly 224 may be deemed absent from query 202.

If threshold 222 is not met by one or more similarities 220 and/or no similar queries 218 are found for query 202, anomaly 224 may be detected, and confidence score 226 may be calculated based on the extent to which threshold 222 is not met. For example, confidence score 226 may have a value that ranges from 0 to 1, with a lower value representing lower confidence in anomaly 224 and a higher value representing higher confidence in anomaly 224. Confidence score 226 may thus be set to 1 or close to 1 if query 202 does not have any similar queries 218 and/or similarities 220 between query 202 and any similar queries 218 are very low compared to threshold 222. Conversely, confidence score may be calculated to be linearly proportional to the difference between the highest similarity and threshold 222 if the highest similarity is relatively close to threshold 222 but does not quite meet threshold 222.

Weights 228, thresholds (e.g., threshold 222), and/or other parameters used to detect anomaly 224 and/or calculate confidence score 226 may additionally be tuned to accommodate other constraints or goals related to anomaly detection in queries. For example, different attributes 206-208 may be selected for inclusion in vector representations 210-212 and/or weights 228 may be adjusted to reflect varying levels of risk associated with different types of database accesses. In another example, weights 228, threshold 222, frequency thresholds, vector representations 210-212, and/or other components used to identify anomaly 224 and/or calculate confidence score 226 may be selected based on a tolerance of the anomaly detection system to false positives and/or computational or memory constraints.

5. FREQUENCY-BASED ANOMALY DETECTION IN RELATIONAL DATABASE QUERIES

Figure 3:
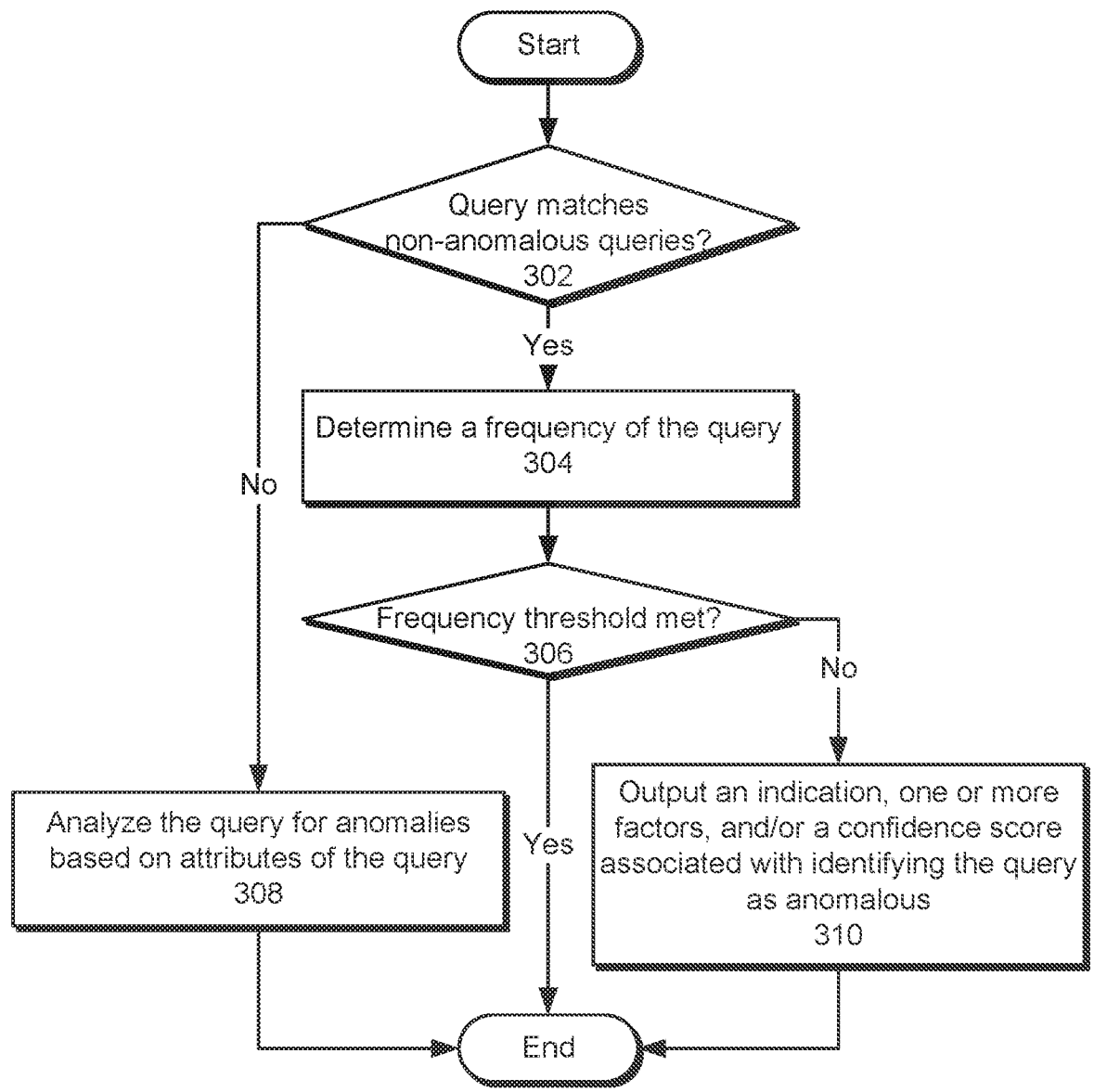
FIG. 3 illustrates a flowchart for performing frequency-based anomaly detection in a relational database query in accordance with one or more embodiments.

FIG. 3 illustrates a flowchart of performing frequency-based anomaly detection in relational database queries in accordance with one or more embodiments. In one or more embodiments, one or more of the steps may be omitted, repeated, and/or performed in a different order. Accordingly, the specific arrangement of steps shown in FIG. 3 should not be construed as limiting the scope of the embodiments.

First, a query may be matched to one or more non-anomalous queries (operation 302). For example, a checksum may be calculated from the query and compared to a set of corresponding checksums for a set of non-anomalous queries. If the query's checksum matches that of one or more non-anomalous queries, an exact match may be found. If the query does not exactly match any non-anomalous queries (e.g., if the query's checksum is not the same as the checksum of any non-anomalous queries), the query is analyzed for anomalies based on attributes of the query (operation 308), as described in further detail below with respect to FIG. 4.

If the query exactly matches one or more non-anomalous queries, the frequency of the query is determined (operation 304) and compared to a frequency threshold (operation 306). For example, the frequency of the query may be calculated as the number of times the query has occurred over a given period and/or a percentile associated with the frequency in a distribution of query frequencies for the same RDBMS and/or database instance. The frequency may then be compared to a frequency threshold that represents a minimum query frequency for the RDBMS and/or database instance. The frequency threshold may be tuned to reflect a given sensitivity, false positive tolerance, and/or other attribute associated anomaly detection.

If the query's frequency meets the frequency threshold, the query may be identified as non-anomalous, and no additional output and/or analysis related to the query is required. If the query's frequency does not meet the frequency threshold, an anomaly may be identified in the query. In turn, an indication of the anomaly, one or more factors associated with the anomaly, and/or a confidence score associated with identifying the query as anomalous are outputted (operation 310). For example, the anomaly may be included in an alert, notification, email, message, and/or other communication. The communication may also include the frequency of the query as a factor in detecting the anomaly and/or a confidence score that is calculated based on the difference between the query's frequency and the frequency threshold.

In addition or as an alternative to analyzing the frequency of exact query matches, the frequency of any portion of a query, such as individual query attributes or combinations thereof, may be analyzed to detect anomalies. For example, if the frequency with which a particular SELECT statement is used exceeds a frequency threshold, then the query may be identified as anomalous. The indication may highlight one or more portions of the query that were deemed to be anomalous. For instance, a query statement that exceeds or otherwise does not satisfy the frequency threshold may be displayed in bold, in a different color, or in a separate are relative to other expressions in the query. Thus, a user may quickly identify which portions of a query may be problematic.

6. ATTRIBUTE-BASED ANOMALY DETECTION IN RELATIONAL DATABASE QUERIES

Figure 4:
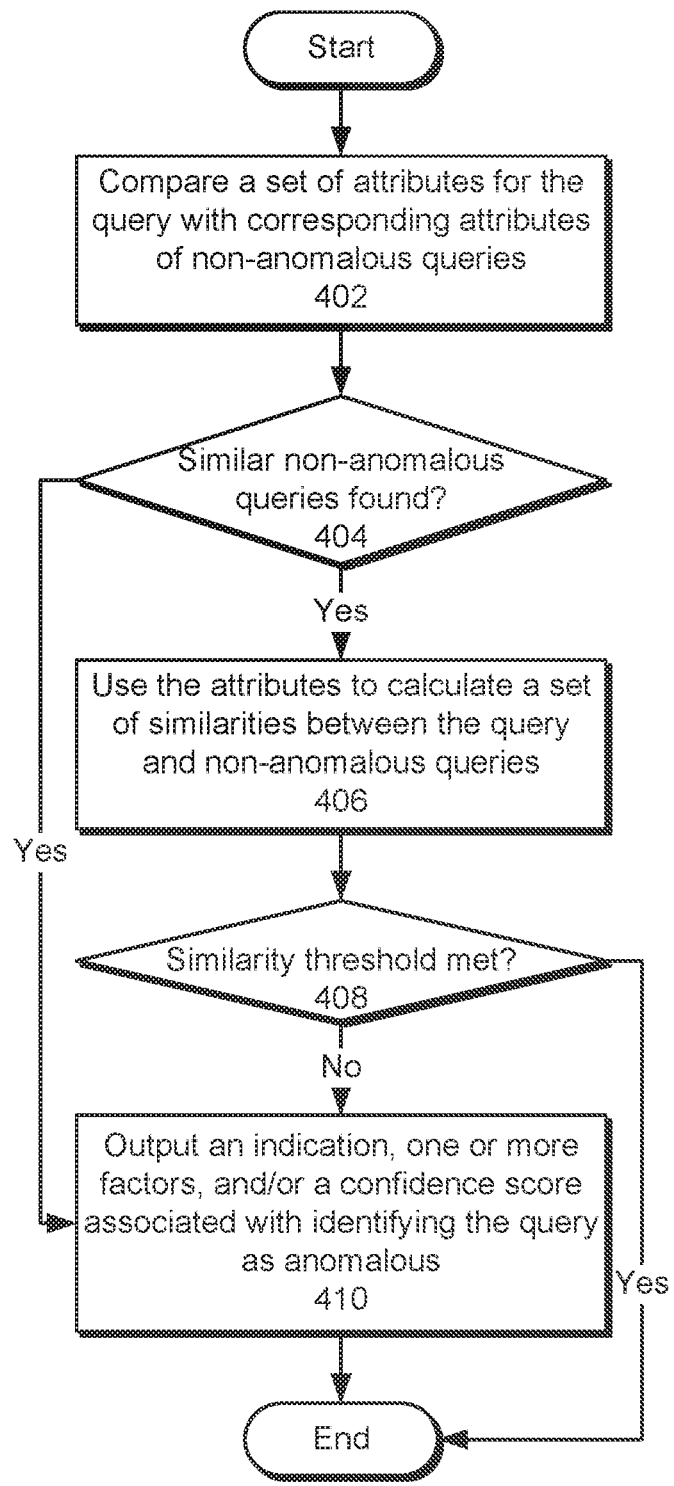
FIG. 4 illustrates a flowchart for performing attribute-based anomaly detection in a relational database query in accordance with one or more embodiments.

FIG. 4 illustrates a flowchart of performing attribute-based anomaly detection in relational database queries in accordance with one or more embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a set of attributes for a query is compared with corresponding attributes of non-anomalous queries (operation 402) to identify a set of similar non-anomalous queries (operation 404). For example, a locality-sensitive hashing technique may be applied to vector representations of semantic and/or non-semantic attributes of the query to identify a general similarity between the query and a subset of non-anomalous queries.

If similar non-anomalous queries cannot be found for the query, an anomaly may be detected in the query. In turn, an indication of the anomaly may be outputted along with one or more factors and/or a confidence score associated with identifying the query as anomalous (operation 410). For example, the indication may include a factor that indicates that the anomaly was detected based on a lack of similar queries and/or a high confidence score that reflects the lack of similar queries.

If similar non-anomalous queries are found, the attributes are used to calculate a set of similarities between the query and non-anomalous queries (operation 406). For example, a vector representation of attributes in the query may be compared with a vector representation of corresponding attributes in each non-anomalous query to produce an output vector that indicates if a given attribute of the query matches or differs from the corresponding attribute of the non-anomalous query. A set of weights may also be applied to the output vector to generate a scalar similarity score between the query and non-anomalous query.

Similarities calculated between the query and all similar non-anomalous queries are then compared to a similarity threshold (operation 408). If one or more similarities (e.g., the highest similarity from the set of similarities) meet the similarity threshold, no anomaly is found in the query, and no additional output is required. If none of the similarities meet the similarity threshold, an anomaly is found in the query, and an indication of the anomaly may be outputted along with one or more factors and/or a confidence score associated with the anomaly (operation 410). For example, the indication may include a factor that indicates that the anomaly was detected based on a lack of sufficient similarity between the query and similar non-anomalous queries. The factor may additionally identify one or more attributes of the query that differ from the non-anomalous queries. The indication may also, or instead, include a confidence score that is proportional to the difference between the highest similarity and the similarity threshold.

7. DISTRIBUTION MODEL TRAINING

In some embodiments, the system of FIG. 1 includes functionality to train one or more distribution models. Monitoring apparatus 102 may parse queries for a set of feature attributes. Monitoring apparatus 102 may then generate and update distribution models based on the varying values detected in the queries for the feature attributes. The distribution models may approximate or otherwise represent the probability of receiving a particular value or a range of values for a given feature attribute.

In some embodiments, a distribution model comprises a histogram that tracks the distribution of values for a given feature attribute. For example, a histogram model may include several buckets (also referred to as bins), where each bucket corresponds to a count for one or more values for the feature attribute. When a query is received, monitoring apparatus 102 may parse the query to determine whether the query includes the feature attribute. If the feature attribute is included, then monitoring apparatus 102 may fetch the corresponding distribution model for the feature attribute. Monitoring apparatus 102 may then map the value for the feature attribute to a corresponding histogram bucket within the distribution model and increment the histogram bucket count.

In addition or as an alternative to a histogram, a distribution model may track probability distributions using other techniques. Examples include, but are not limited to, cumulative distribution functions and probability distribution functions. Monitoring apparatus 102 may update one or more of these models to reflect the distribution of varying values of feature attributes.

The set of feature attributes that are used to train a distribution model may vary from implementation to implementation. Examples include, but are not limited to, any of the semantic and non-semantic attributes previously listed. In some embodiments, a distribution model corresponds to an individual feature and is trained using varying values for the feature as parsed from the set of queries used to train the model. Additionally or alternatively, one or more distribution models may correspond to a combination of two or more feature attributes and may be trained from a combination of values of the two or more feature attributes. For example, a particular feature attribute USER_NAME_ORIG may correspond to the username or other identifier of the user submitting the query. Another feature attribute SRVR_HOST may correspond to a hostname or other identifier for the server from which the query originated. One or more distribution models may be trained based on the varying attribute values detected for USER_NAME_ORIG, SRVR_HOST, and/or the combination of these two feature attributes.

Although the examples of semantic attributes described herein relate to SQL expressions for queries in a relational database, the semantic attributes may comprise query expressions in other query languages such as multidimensional expressions (MDX) or systems that interpret natural language queries. Therefore, the techniques described herein are not limited to a particular query syntax or language.

Figure 5:
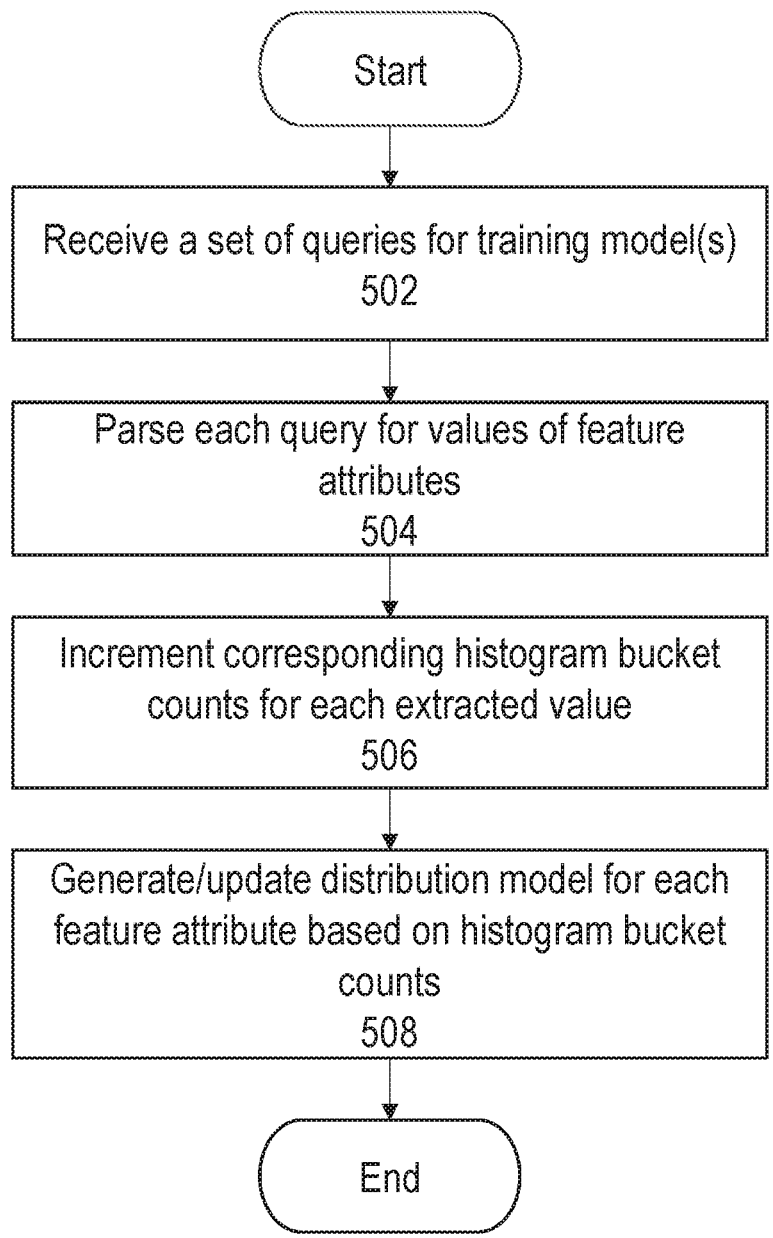
FIG. 5 illustrates a flowchart for training a distribution model in accordance with one or more embodiments.

FIG. 5 illustrates a flowchart for training a distribution model. In some embodiments, one or more of the steps may be omitted, repeated, and/or performed in a different order. Accordingly, the specific arrangement of steps shown in FIG. 5 should not be construed as limiting the scope of the embodiments.

The process includes receiving a set of queries for training one or more distribution models (operation 502). The set of queries may be received and processed as a group, such as part of a batch process. In other cases, queries may be received and processed one at a time. For example, training may be a continuous process whereby each newly received query is used to update the set of distribution models. This allows the models to evolve as new patterns are learned over time.

The training process further includes parsing each query for values of feature attributes (operation 504). For example, a parser may be configured to search for the presence of one or more semantic and/or non-semantic attributes previously listed. If detected, then the parser may extract the values for the detected attributes.

The training process further includes incrementing corresponding histogram bucket counts for each extracted value for the feature attributes (operation 506). In some embodiments, a separate histogram is maintained for each feature. The histogram may then track the distribution of values for the corresponding feature. For example, one feature may correspond to a column feature. The corresponding histogram may comprise a set of buckets corresponding to column names that have been detected within the training set of queries. A bucket for a given column may be incremented each time the column is referenced within a query. Another histogram may correspond to a username feature. The corresponding histogram may comprise a set of buckets corresponding to usernames that have been detected in association with the set of queries (e.g., the names of the users submitting the queries). The bucket for a given username may be incremented each time a query originates from a user having the username. Other histograms may similarly be maintained based on the varying values of individual features or feature combinations.

The training process further comprises generating or updating the distribution model for each feature attribute based on the histogram bucket counts (operation 508). For example, this operation may comprise performing one or more of the following:

Computing the log transform histogram frequency counts across each feature attribute;
Computing the average value for the feature attribute;
Identifying the most frequent value for the feature attribute;
Computing standard deviations for the histogram buckets;
Computing Z-scores from histogram frequency counts for each histogram bucket;
Identifying outlier buckets based on a probability cutoff (such as a Z-score cutoff, standard deviation threshold, or a percent area under a histogram or cumulative distribution curve).

One or more of the above values may be stored for the distribution model in volatile and/or non-volatile storage. The model for a given feature may be fetched during the evaluation phase in an on-demand fashion.

The training process depicted in FIG. 5 is able to learn query patterns in a manner that scales linearly with the number of records in the learning dataset. For non-semantic features, the learning step involves very low overhead, since the training process may increment the frequency count for the feature value and complete. For semantic features, such as SQL features, there may be a slight overhead of parsing the query expression. This overhead may be ameliorated by a cache that maps a hash code to a list of extracted query expression, such as SQL statements. As a result, if the same SQL statement is observed again, the parsing step may be skipped and the SQL signals are fetched directly from the cache.

In some embodiments, the training process may allow for user feedback. For example, a user may clear the "outlier" status of one or more histogram buckets in a distribution model. In response, the model may be updated to remove the outlier classification for these buckets. As another example, a histogram bucket may transition from an outlier status to a non-outlier status as more queries are received that include a value that maps to the bucket. In this case, a notification may be sent to a user. The user may choose to maintain the outlier classification of the histogram bucket if concerned with the sudden increase in frequency with which the value is used or the user may allow the transition to proceed, thereby clearing the outlier status for the histogram bucket. In the former case, alerts may continue to be generated for queries that include values mapping to the bucket even though these values satisfy a probability cutoff. In the latter case, alerts are no longer triggered for feature values mapped to the histogram bucket.

In some embodiments, the training process may group histograms. For example, a set of histograms may be grouped on a per-user basis, a per-asset basis, or a combination of groups such as a per <user, asset> pair. Additionally or alternatively, a group of histograms may be global, thereby spanning all entities. Grouped histograms allow for efficient machine-learning at the entity level. For example, a group of histograms may provide a per-user distribution of SQL activity. As another example, a group of histograms may provide a per-asset (e.g., server or similar host) distribution of SQL activity. Thus, grouping allows for efficient partitioning of a search space at the level of a specified entity, such as a user or asset.

In some embodiments, a partitioned search space is provided, as input, to further speed up training of new models or identification of anomalies. For example, a group of histogram models for a particular user, asset, or other entity may be used to train one or more additional models. This allows additional models to learn group patterns and identify anomalies specific to the group. For instance, a value for a feature attribute that is anomalous for one group may not be anomalous for another group.

8. DISTRIBUTION MODEL EVALUATION

In some embodiments, the system of FIG. 1 includes functionality to evaluate one or more distribution models against a query to determine whether the query is anomalous. For example, when a new query is received, monitoring apparatus 102 may parse the query to extract values for a set of feature attributes. Monitoring apparatus 102 may then compare the values to the one or more distribution models to determine how frequently the values have been observed in the set of previously received queries relative to other values for the feature attribute. If the frequency of one or more feature attributes does not satisfy a threshold cutoff, then monitoring apparatus 102 may output an indication that the query is anomalous.

Figure 6:
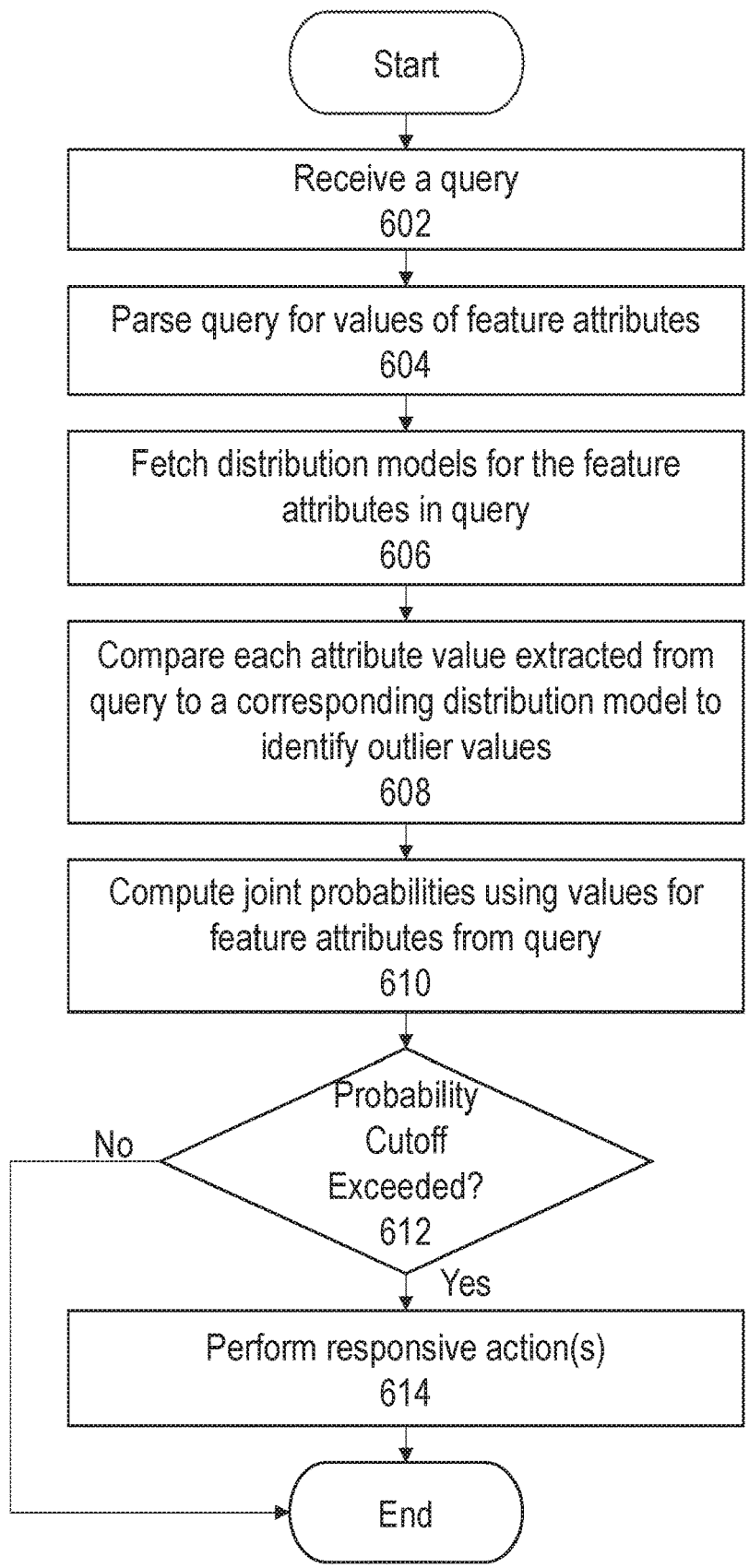
FIG. 6 illustrates a flowchart for evaluating a set of one or more distribution models to determine whether a query is anomalous in accordance with one or more embodiments.

FIG. 6 illustrates a flowchart for evaluating a set of one or more distribution models to determine whether a query is anomalous. In some embodiments, one or more of the steps may be omitted, repeated, and/or performed in a different order. Accordingly, the specific arrangement of steps shown in FIG. 6 should not be construed as limiting the scope of the embodiments.

The evaluation process includes receiving a query for analysis (operation 602). The query that is received may generally comprise any type of query for accessing data from a database. For example, the query may be a query conforming to a SQL syntax for accessing data from a relational database. As another example, the query may be a natural language query for accessing data through a search engine. Other query types and formats may be analyzed, depending on the particular implementation.

The evaluation process includes parsing the received query to extract the values of one or more feature attributes (operation 604). For example, a parser may be configured to search for the presence of one or more semantic and/or non-semantic attributes previously listed. If detected, then the parser may extract the values for the detected attributes.

The evaluation process further includes fetching one or more distribution models for the feature attributes detected within the query (operation 606). This operation may include fetching a distribution model for individual feature attributes and/or any combination of feature attributes. For instance, a parser may extract values for the attribute USER_NAME_ORIG, and the attribute SRVR_HOST. In this example, the process may fetch one distribution model trained to capture the distribution of usernames in previously received queries for the attribute USER_NAME_ORIG and another distribution model trained to capture the distribution of server hostnames for the attribute SRVR_HOST. Additionally or alternatively, the process may fetch a distribution model that tracks the distribution of combined values for the attribute pair <USER_NAME_ORIG, SRVR_HOST>.

The evaluation process further includes comparing attribute values extracted from query to a corresponding distribution model to identify outlier values (operation 608). In the preceding example, for instance, a username may be compared to the distribution model for USER_NAME_ORIG and a server hostname may be compared to the distribution model for SRVR_HOST. Additionally or alternatively, the combined values for <USER_NAME_ORIG, SRVR_HOST> may be compared to a distribution model for the attribute pair <USER_NAME_ORIG, SRVR_HOST>.

In some embodiments, only distribution models for features included with or in association with the query are fetched from memory at this operation. Distribution models for other query features are not processed if the query does not include these feature attributes. This approach allows the comparison to be performed in a time that is linear to how many attributes values exist in a set of attribute values extracted from the query and does not depend on variability of the previously received queries. Stated another way, the evaluation process has a best, worst, and average case run-time performance of O(1). The run-time is independent of the size of the learned dataset and has an O(n) dependency on the feature set, where "n" is the count of feature attributes extracted from the query under evaluation.

In some embodiments, comparing the values to the distribution model comprises mapping the values to a histogram bucket. If the histogram bucket has been classified as an outlier, then the attribute value in the query is also classified as an outlier. If the histogram bucket is not an outlier, then the attribute value is classified as normal. As previously mentioned, an outlier may be determined based on a probability cutoff (such as a Z-score cutoff, standard deviation threshold, or a percent area under a histogram or cumulative distribution curve). Thus, values that are not frequently observed may be flagged as outliers, whereas common values are classified as normal.

The evaluation process further includes computing joint probabilities using values for feature attributes from query (operation 610). In some embodiments, the joint probability is computed by multiplying the individual probabilities of each individual feature value together. For example, the joint probability p(x) for a new example x may be computed as follows:

$$p(x) = \prod_{j=1}^{n} p(x_j; \mu_j, \sigma_j^2) = \prod_{j=1}^{n} \frac{1}{\sqrt{2\pi}\,\sigma_j} \exp\left(-\frac{(x_j - \mu_j)^2}{2\sigma_j^2}\right)$$

where $x_j$ is a frequency count for a value for one of n feature attributes extracted from a newly received query (i.e., example x) and where the individual probability is given by:

$$\frac{1}{\sqrt{2\pi}\,\sigma_j} \exp\left(-\frac{(x_j - \mu_j)^2}{2\sigma_j^2}\right)$$

where the model parameter $\mu_j$ is the average of a histogram distribution that is fit as follows:

$$\mu_j = \frac{1}{m} \sum_{i=1}^{m} x_j^{(i)};$$

and the model parameter $\sigma_j^2$ is the standard deviation of the histogram distribution that is fit as follows:

$$\sigma_j^2 = \frac{1}{m} \sum_{i=1}^{m} (x_j^{(i)} - \mu_j)^2$$

Other probabilistic functions may also be used to compute the joint probability, depending on the particular limitation.

The evaluation process further includes determining whether a probability cutoff is satisfied (operation 612). The probability cutoff may be defined as one or more thresholds. For example, a probability cutoff may be defined based on how many of the feature attributes in a newly received query are outliers. If the number of outliers is greater than a threshold, then the query may be classified as anomalous. Otherwise, the query may be classified as normal. As another example, a probability cutoff may be defined based on a percentile threshold for the joint probability. If the joint probability is less than the threshold, then the query may be classified as anomalous. Otherwise, the query may be classified as normal. The thresholds may be configurable and used to assign a risk level to a query, as described further in the section below.

If the probability cutoff is not satisfied, then the evaluation process performs one or more responsive actions (operation 614). The responsive actions that are taken may vary from implementation to implementation and may be configurable by an end user as described further in the section below. Example responsive actions may include, but are not limited to, outputting an indication that the query is anomalous, preventing execution of the query, and generating a summary of why the query is anomalous. The responsive actions may prevent malicious or otherwise problematic queries from being executed and help administrators isolate the anomalies within the query.

9. ADAPTIVE THRESHOLDING AND RESPONSIVE ACTIONS

As previously mentioned, a set of one or more threshold may be defined that control whether a query or query attribute is classified as anomalous or normal. In some embodiments, one or more of the thresholds may be manually and/or automatically configurable. For example, a user may manually set the probably cutoff to a specific number of permissible outliers or a threshold percentile. As another example, a user may specify a threshold number of alerts to generate within a given timeframe (e.g., per-day or per week). The anomaly detection system may monitor the rate at which alerts are being generated. The anomaly detection system may then automatically adjust the probability cutoff up or down to increase or decrease the rate at which alerts are generated.

In some embodiments, risk levels are assigned to a query based on a set of thresholds. For example, a risk level may be assigned as follows:

| Assigned Risk Level | Assignment Criteria |
|---|---|
| LOW | At least one feature attribute in the query has a value mapped to an outlier bucket |
| MEDIUM | The majority of feature attributes in the query have values mapped to an outlier bucket |
| HIGH | The joint probability p(x) is less than a cutoff |
| CRITICAL | The joint probability p(x) is less than a cutoff AND the majority of feature attributes in the query are mapped to an outlier bucket |

In the example chart provided above, the assigned risk level to a query is LOW or MEDIUM if the joint probability is greater than or equal to the cutoff, but one or more feature attributes have been classified as outliers. In the event that the joint probability is less than a cutoff, then the assigned risk level is HIGH or CRITICAL depending on whether the majority of feature attributes have been classified as outliers or not. The assignment criteria for each risk level may vary from implementation to implementation and may be configurable by an end user. Further the cutoffs used to classify individual feature attributes as outliers or the joint probability as an outlier may be manually or automatically configurable.

In some embodiments, different responsive actions may be triggered for different risk levels. For example, a user may configure the anomaly detection system to stop execution of a query assigned a risk level of CRITICAL or HIGH. The system may allow the query to execute, but generate an alert to notify a user if the risk level assigned is MEDIUM. The system may allow the query to proceed to execution without generating an alert if the assigned risk level is LOW. The responsive actions that are taken for each risk level may vary from implementation to implementation and may be configurable by the end user. For example, a user may only wish to be notified of queries with an assigned risk level of CRITICAL to reduce the number of alerts. In other cases, the user may receive alerts across all assigned risk levels to cast a wider net.

In some embodiments, when an anomaly is detected, the system generates a summary that includes an explanation of why the query is anomalous. The explanation may be generated based on the comparison between the set of attribute values from the query with probability distributions for different query attributes as previously described in the evaluation phase. For example, the summary may highlight a subset of the probability distributions when an attribute value is deemed anomalous. As another example, the system may present, through a GUI or other interface, a list of query attributes that have been classified as outliers. The summary may further present the risk level assigned to the user. The summary allows a user to assess what parts of a query are anomalous and the level of risk associated with executing the query.

10. HISTOGRAM-BASED ANOMALY DETECTION EXAMPLE

A detailed example of using a set of histogram models to detect query anomalies is described below for purposes of clarity. Components and/or operations described below should be understood as one specific example, which may not be applicable to certain embodiments. Accordingly, components and/or operations described below should not be construed as limiting the scope of any of the claims.

In some embodiments, a learning dataset with sample events may have the format [User_Account, IP_Address, SQL_CMD]. An example learning dataset that follows this format is provided below:

John, 122.34.212.80, SELECT * FROM EMP
Mary, 90.45.68.23, SELECT * FROM DEPT
John, 122.34.212.80, SELECT * FROM EMP
John, 122.34.212.80, SELECT * FROM EMP
John, 122.34.212.80, SELECT * FROM DEPT
Mary, 90.45.68.23, SELECT * FROM EMP
Mary, 90.45.68.23, SELECT * FROM EMP
Mary, 90.45.68.23, SELECT * FROM DEPT
John, 122.34.212.80, SELECT * FROM DEPT
John, 122.34.212.80, SELECT * FROM DEPT
John, 122.34.212.80, SELECT * FROM MGR
Mary, 90.45.68.23, SELECT * FROM MGR
Tina, 122.34.212.80, SELECT * FROM MGR If the selected feature attributes are SQL_CMD, SQL_FLEX_1, and USER_ACCOUNT, then the training process learns from the dataset by generating three separate histogram distributions. The first distribution is based on SQL_CMD, the second distribution is based on SQL_FLEX_1, and the third distribution is based on USER_Account.

Each row within a histogram distribution may include the following properties: [Histogram Category, Feature/Attribute Name, Feature/Attribute Value, Frequency Count, Log-Normalized Frequency Count, Z-Score, Is this entry an anomaly?]. The decision on whether a specific histogram row represents an anomaly may be based on a user-specified Z-score cutoff or a percentile cutoff.

Figure 7A:
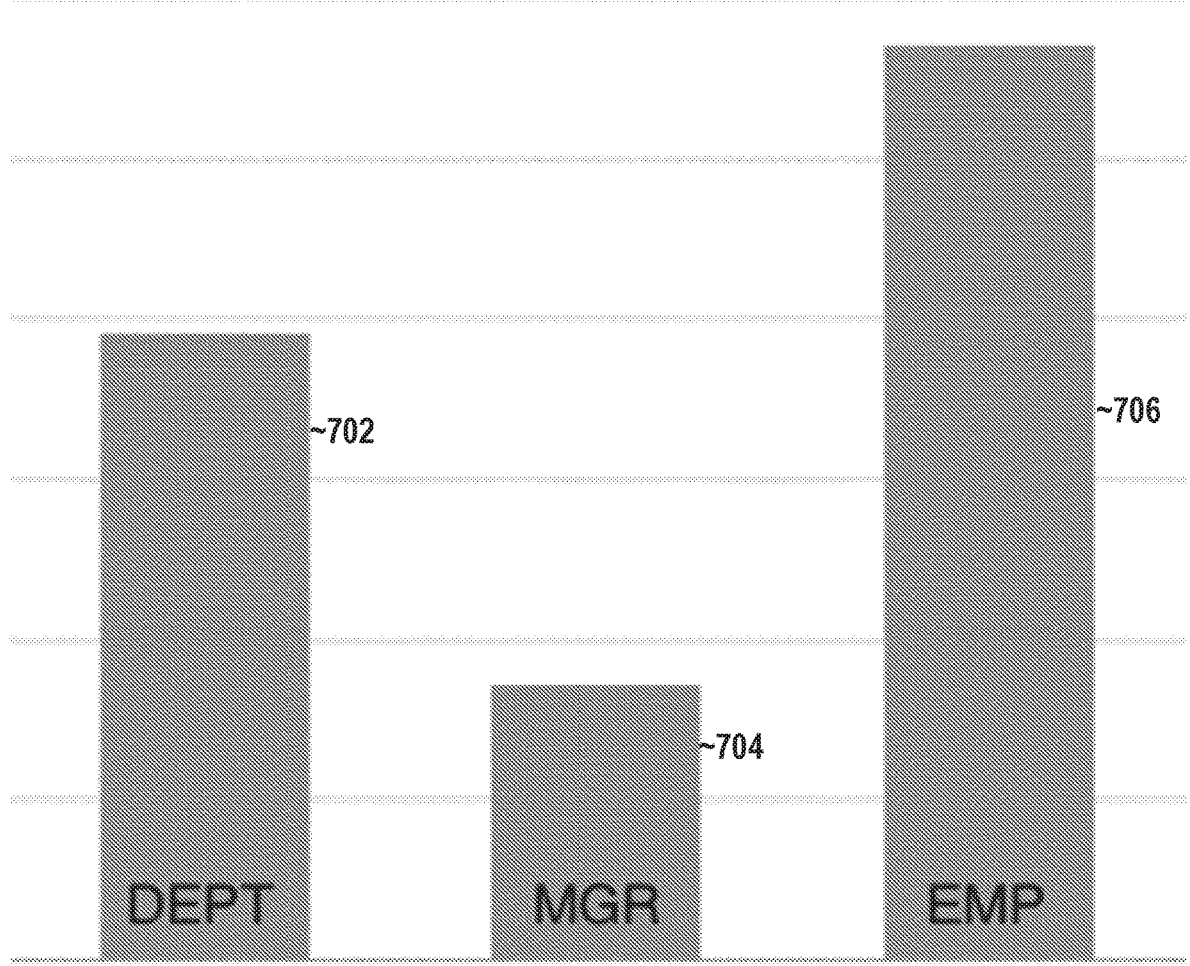
FIG. 7A illustrates an example set of initialized histogram bins in accordance with one or more embodiments.

Given the above parameters, an example set of histogram models may be generated as follows:
SQL_BEHAVIOR Histograms Model (cutoff=10.00%, avg=14.3922, stddev=7.6030):
SQL_BEHAVIOR, SQL_CMD, SELECT, 890081, 14.3922, 0.0000, false
SQL_BEHAVIOR, SQL_CMD, ALTER_SESSION, 8755, 9.7705, −0.6079, false
SQL_BEHAVIOR, SQL_CMD, INSERT, 7, 2.6391, −1.5459, true
SQL_BEHAVIOR, SQL_CMD, ALTER_DATABASE, 1, 0.6931, −1.8018, true
User_Behavior Histograms Model (cutoff=10.00%, avg=14.7815, stddev=9.7735):
User_Behavior, User_Account, John, 1313638, 14.7815, 0.0000, false
User_Behavior, User_Account, Mary, 42, 4.4308, −1.0590, false
User_Behavior, User_Account, Tina, 2, 1.3863, −2.1706, true
SELECT_SQL Histograms Model (cutoff=10.00%, avg=13.3455, stddev=10.2805):

SELECT_SQL, SQL_FLEX_1, EMP, 312484, 13.3455, 0.0000, false
SELECT_SQL, SQL_FLEX_1, DEPT, 14349, 10.2646, −0.2997, false
SELECT_SQL, SQL_FLEX_1, MGR, 6, 2.4849, −1.5648, true Example learning and evaluation steps for detecting anomalies based on the above models is described in further detail below. The steps include generating and initializing a set of histogram bins (also referred to as buckets) based on a frequency count of a specified feature. For example, FIG. 7A illustrates an example set of initialized histogram bins. The example shows different bins, including bin 702, bin 704, and bin 706, for the specified feature SQL_FLEX_1.

Figure 7B:
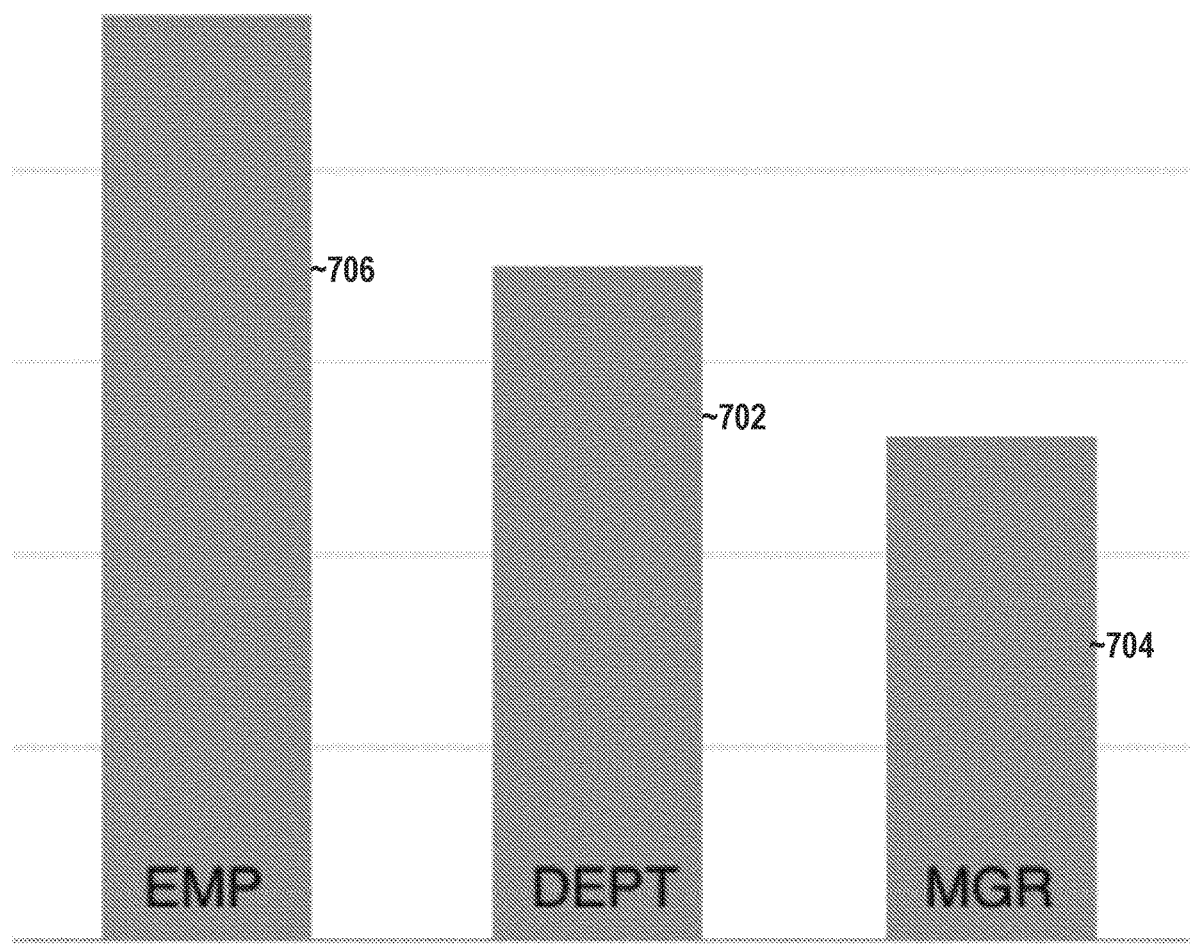
FIG. 7B illustrates an example set of histogram bins that have been sorted in descending order in accordance with one or more embodiments.

Once the bins have been initialized, the bins may be sorted, such as in descending or ascending order. The tallest bin corresponds to the most frequent value and may be designated as the mean of the distribution. The Z-scores for each bin may be computed based on the log normal frequency counts. For example, FIG. 7B illustrates an example set of histogram bins that have been sorted in descending order. In this example, bin 706 comes first, followed by bin 702, which is followed by bin 704. Bin 706, corresponding to the value "EMP", is the tallest bin and is thus designated as the mean of the distribution.

Figure 7C:
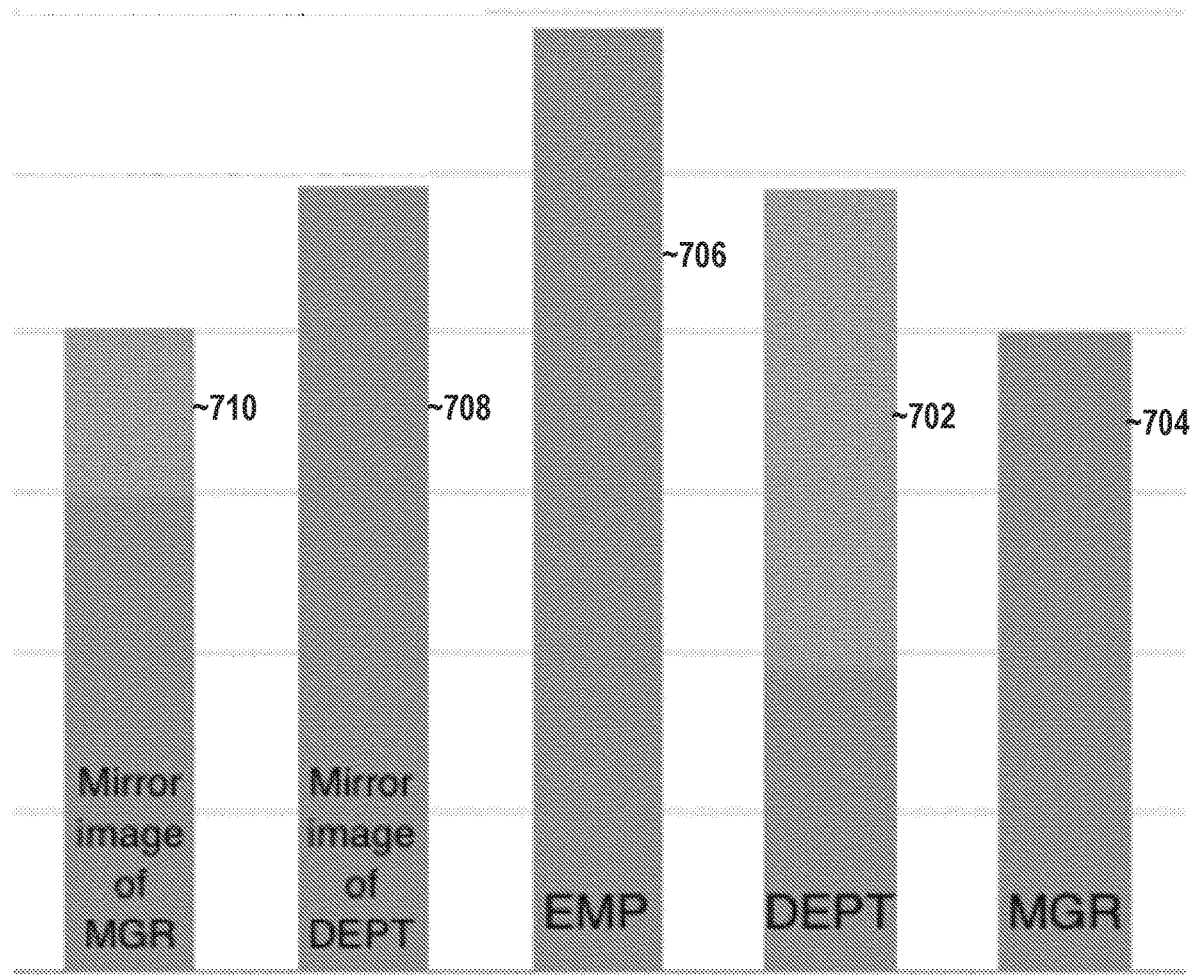
FIG. 7C illustrates an example set of histogram bins that follow a symmetric distribution in accordance with one or more embodiments.

The average and standard deviation metrics for the histogram distribution illustrated in FIG. 7B are the same as those for symmetric distributions, which has the tallest bin at the center, all other sorted bins on the right, and mirror images of the sorted bins on the left. For example, FIG. 7C illustrates an example set of histogram bins that follow a symmetric distribution. As can be seen, bin 706 is in the middle, with bins 702 and 704 in a sorted order to the right. Bins 708 and 710 are mirror images of bins 702 and 704, respectively.

Figure 7D:
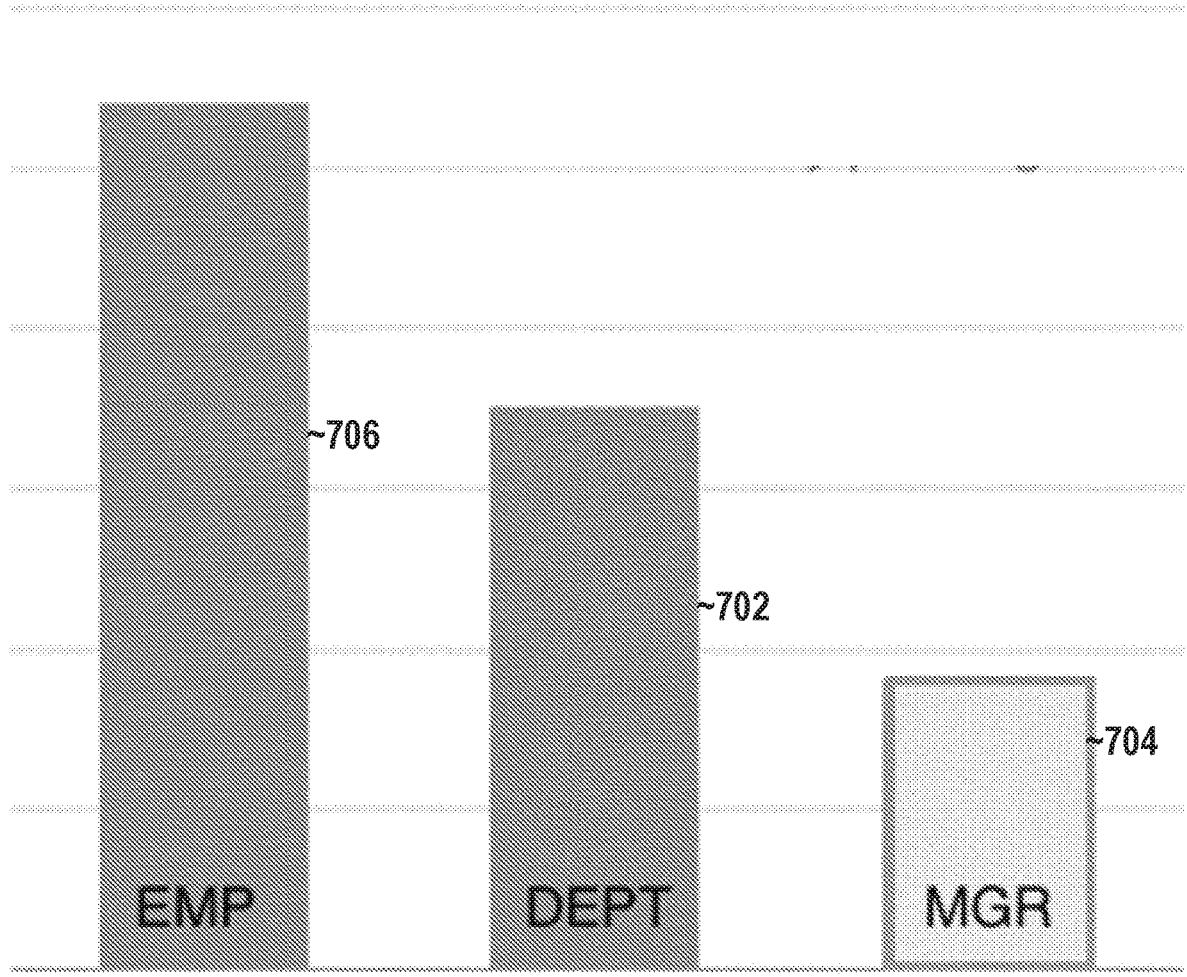
FIG. 7D illustrates an example set of sorted histograms whereby the outlier bin is visually highlighted in accordance with one or more embodiments.

Once the bins have been sorted, the outlier bins may be identified based on the Z-score or percentile cutoffs. Since the histogram for a given feature attribute is based on frequency counts of the individual attribute values, the histogram represents a probability distribution of the likelihood of each individual feature attribute. As a result, the explanation of individual attribute values, such as a classification of whether the values are normal/high probability or anomalous/low probability becomes clear and intuitive. In some embodiments, the outlier bins are displayed in a different color or displayed in some other standout scheme to allow the bins to be more easily identified visually in comparison to other "normal" bins. FIG. 7D illustrates an example set of sorted histograms whereby the outlier bin is visually highlighted. In the example, bin 704 is displayed with a different visual scheme to bring attention to its status as an outlier. In addition or as an alternative to displaying outlier buckets in a different color scheme, labels may be added to identify the outlier buckets. For example, the text "OUTLIER" may be added within or adjacent to each outlier bin in a histogram.

In some embodiments, the histograms illustrated in FIGS. 7A-D are presented to a user through a GUI as part of an interactive visualization. The interactive visualization may allow the user to click on, highlight, and/or otherwise interact with a histogram bin. Upon selecting a histogram bin, the user may be presented with additional information, such as the exact frequency count, Z-score, and standard deviation associated with the bin. The interactive visualization may allow a user to change the classification of a bin. For example, the user may change a bin classified as an outlier to normal or vice versa. As another example, the user may specify responsive actions to take with respect to a particular bin. For instance, a user may specify that one value should suspend execution of the query until permission is given to proceed from an authorized system administrator. Another outlier bin may simply trigger alerts but may allow execution of the query to proceed. Thus, the types of responsive actions may be specified on a per-bin basis.

During the training process, the probability for each feature value/histogram bin may be computed using the probability formula provided above. During the evaluation phase, these probabilities may be determined by mapping the values extracted from the query to the corresponding histogram bin. For example, if the query includes the value "MGR', then the outlier classification and probability value may be determined by mapping the feature value to bin 704

Joint probabilities may also be computed with reference to a dataset of predicted events using the joint probability formula provided above. For example, the prediction dataset may be formed using varying values for the feature attributes. The exact combination of values for a predicted event may not have occurred in a previously received query, although the individual values may have been extracted from these queries. The learning process may mark each prediction event as an anomaly if the joint and/or independent probability is less than a pre-determined cutoff "ε".

In some embodiments, a user may be prompted to input a tolerance on the number of alert notifications that are received within a given timeframe, such as per day, week, or month. Responsive to the input, multiple iterations may be run over the prediction dataset with different cutoffs. The cutoff that restricts the anomaly count below the user-specified threshold may be automatically selected. Each event's joint, independent event probability is already known and is not re-computed in each iteration. The process compares the probability to the new "ε" cutoff, and subsequently compares the total anomaly count to user's threshold. This approach allows the user to efficiently and effectively control the false positives (FPs) generated by the anomaly detection system. The prediction process scales linearly with the number of records in the prediction dataset. The prediction process has a best, worst, and average case run-time performance of $O(1)$. The run-time is independent of the size of the prediction dataset and has an $O(n)$ dependency on the feature attribute set, where "n" is the count of the extracted feature attributes.

11. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread). A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application-programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

12. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

13. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
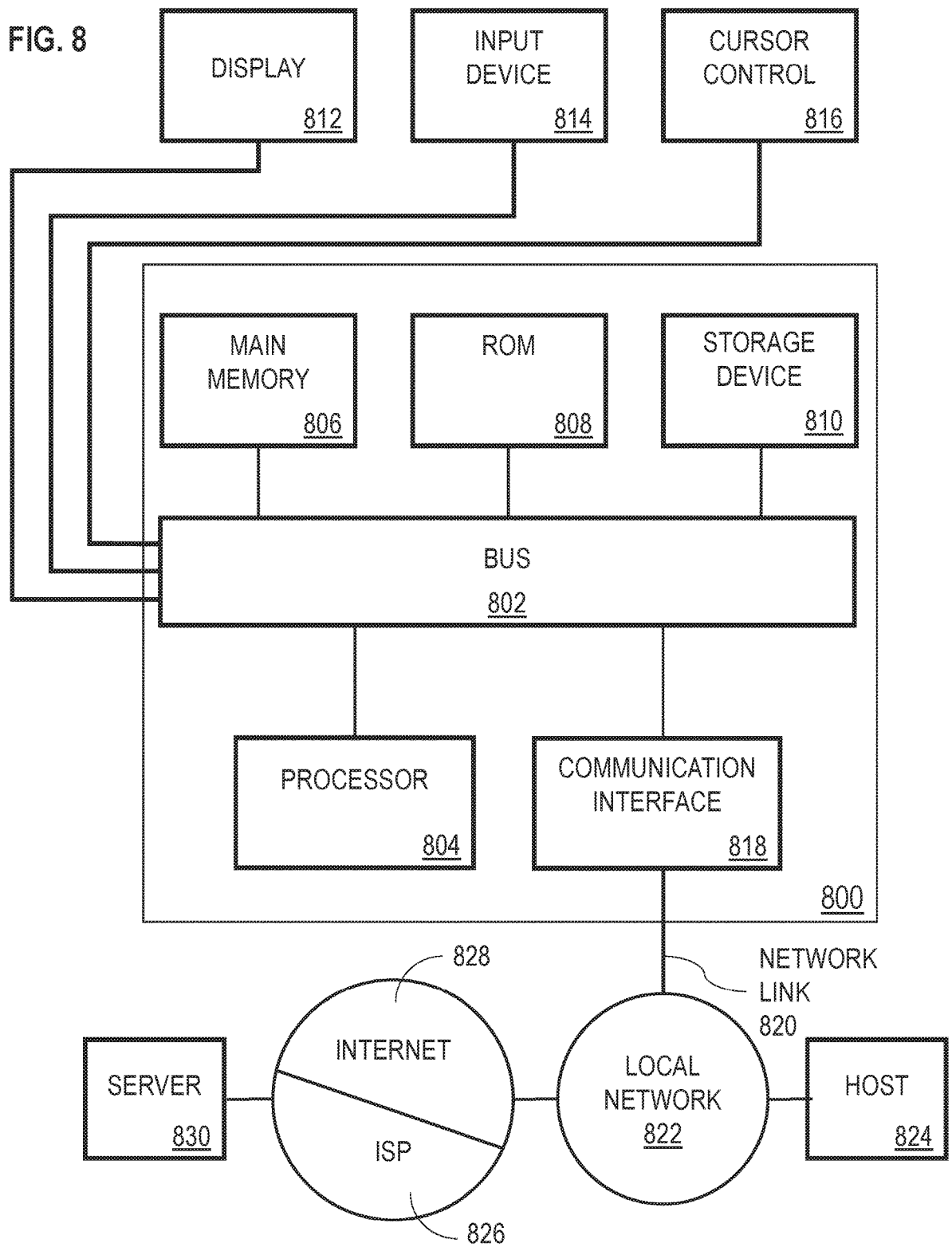
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    identifying a set of attribute values, for a corresponding set of attributes, from a query for accessing data within a database;
    for a particular attribute value of the set of attribute values:
    responsive to comparing a frequency of the particular attribute value with one or more other attribute values for the corresponding attribute in a set of previously-received queries, determining a probability of receiving the particular attribute value in the query; and
    determining whether the probability of receiving the particular attribute value in the query meets a threshold value; and
    responsive to determining that the probability of receiving the particular attribute value in the query does not meet the threshold value:
    outputting an indication that the query is anomalous.

2. The medium of claim 1, wherein the operations further comprise storing a probability distribution for each attribute in a set of query attributes, the probability distribution including values representing the frequency of the particular attribute value and the frequency of the one or more other attribute values for the corresponding attribute in the set of previously-received queries; and
    wherein determining the probability of receiving the particular attribute value in the query comprises comparing each attribute value in the set of attribute values from the query to the probability distribution for a corresponding attribute in the set of query attributes.

3. The medium of claim 2, wherein comparing each attribute value in the set of attribute values from the query is performed in a time that is linear to how many attributes exist in the set of attribute values and does not depend on variability of the previously received queries.

4. The medium of claim 2, wherein the probability distribution for each respective attribute is a histogram model that is trained from attribute values for the respective attribute extracted from the previously received queries.

5. The medium of claim 1, wherein the operations further comprise receiving user input indicating an acceptable false positive threshold for reporting anomalous queries; and
responsive to the user input, automatically adjusting the probability cutoff.

6. The medium of claim 1, wherein the indication includes an explanation of why the query is anomalous; and
wherein the explanation is generated based on a comparison between the set of attribute values from the query with probability distributions for different query attributes and highlighting a subset of the probability distributions when an attribute value is deemed anomalous.

7. The medium of claim 1, the operations further comprising assigning a risk level to the query based on how many of the attribute values in the set of attribute values are outliers and whether a joint probability for the set of attribute values satisfies a probability cutoff.

8. The medium of claim 1, wherein the set attribute values includes a first attribute value for a semantic attribute and a second attribute value for a non-semantic attribute.

9. The medium of claim 1, wherein the operations further comprise preventing execution of the query.

10. A method comprising:
identifying a set of attribute values, for a corresponding set of attributes, from a query for accessing data within a database;
for each particular attribute value of the set of attribute values:
responsive to comparing a frequency of the particular attribute value with one or more other attribute values for the corresponding attribute in a set of previously received queries, determining a probability of receiving the particular attribute value in the query; and
determining whether the probability of receiving the particular attribute value in the query meets a threshold value;
determining, based on the respective probabilities of receiving each attribute value of the set of attribute values in the query, a joint probability for the set of attribute values for the query; and
when the joint probability for the set of attribute values for the query does not satisfy a probability cutoff, outputting an indication that the query is anomalous.

11. The method of claim 10, wherein the method further comprises storing a probability distribution for each attribute in a set of query attributes, the probability distribution including values for the frequency of the particular attribute value and the frequency of the one or more other attribute values for the corresponding attribute in the set of previously-received queries; and
wherein determining the joint probability for the set of attribute values for the query comprises comparing each attribute value in the set of attribute values from the query to the probability distribution for a corresponding attribute in the set of query attributes.

12. The method of claim 11, wherein comparing each attribute value in the set of attribute values from the query is performed in a time that is linear to how many attributes exist in the set of attribute values and does not depend on variability of the previously received queries.

13. The method of claim 11, wherein the probability distribution for each respective attribute is a histogram model that is trained from attribute values for the respective attribute extracted from the previously received queries.

14. The method of claim 10, wherein the method further comprises receiving user input indicating an acceptable false positive threshold for reporting anomalous queries; and
responsive to the user input, automatically adjusting the probability cutoff.

15. The method of claim 10, wherein the indication includes an explanation of why the query is anomalous;
wherein the explanation is generated based on a comparison between the set of attribute values from the query with probability distributions for different query attributes and highlighting a subset of the probability distributions when an attribute value is deemed anomalous.

16. The method of claim 10, the method further comprising assigning a risk level to the query based on how many of the attribute values in the set of attribute values are outliers and whether the joint probability for the set of attribute values satisfies the probability cutoff.

17. The method of claim 10, wherein the set attribute values includes a first attribute value for a semantic attribute and a second attribute value for a non-semantic attribute.

18. The method of claim 10, wherein the method further comprises preventing execution of the query.

19. The method of claim 10, wherein determining the joint probability for the set of attribute values comprises multiplying together the individual probabilities for each particular attribute value of the set of attribute values.

20. A system comprising:
one or more hardware processors;
one or more non-transitory computer readable media storing instructions which, when executed by the one or more hardware processors, causes performance of operations comprising:
identifying a set of attribute values, for a corresponding set of attributes, from a query for accessing data within a database;
for each particular attribute value of the set of attribute values:
responsive to comparing a frequency of the particular attribute value with one or more other attribute values for the corresponding attribute in a set of previously received queries, determining a probability of receiving the particular attribute value in the query; and
determining whether the probability of receiving the particular attribute value meets a threshold value;
determining, based on the respective probabilities of receiving each attribute value of the set of attribute values, at least one of a joint probability for the set of attribute values or individual probabilities for the set of attribute values; and
when at least one of the joint probability for the set of attribute values or an individual probability for receiving one or more attribute values in the set of attribute values does not satisfy a probability cutoff, outputting an indication that the query is anomalous.

21. The system of claim 20, wherein the operations further comprise storing a probability distribution for each attribute in a set of query attributes; and
wherein determining, based on the respective probabilities of receiving each attribute value of the set of attribute values, at least one of the joint probability for the set of attribute values or individual probabilities for the set of attribute values comprises comparing each attribute value in the set of attribute values from the query to the probability distribution for a corresponding attribute in the set of query attributes.

22. The system of claim 20, wherein determining the at least one of a joint probability for the set of attribute values or individual probabilities for the set of attribute values comprises determining the joint probability for the set of attribute values, and wherein determining the joint probability for the set of attribute values comprises multiplying together the individual probabilities for each particular attribute value of the set of attribute values.

23. A method, comprising:

identifying a set of attribute values, for a corresponding set of attributes, from a query for accessing data within a database;

for a particular attribute value of the set of attribute values:

responsive to comparing a frequency of the particular attribute value with one or more other attribute values for the corresponding attribute in a set of previously-received queries, determining a probability of receiving the particular attribute value in the query; and determining whether the probability of receiving the particular attribute value in the query meets a threshold value; and responsive to determining that the probability of receiving the particular attribute value in the query does not meet the threshold value:

outputting an indication that the query is anomalous.

* * * * *

UNITED STATES PATENT AND TRADEMARK OFFICE
CERTIFICATE OF CORRECTION

PATENT NO. : 11,055,407 B2  
APPLICATION NO. : 16/143239  
DATED : July 6, 2021  
INVENTOR(S) : Herwadkar et al.

Page 1 of 1

It is certified that error appears in the above-identified patent and that said Letters Patent is hereby corrected as shown below:

In the Specification

In Column 4, Line 44, delete "RDMBS" and insert -- RDBMS --, therefor.

In Column 8, Line 2, after "that" delete "e 111".

In Column 8, Line 64, delete "J.JO_ID," and insert -- J.JOB_ID, --, therefor.

In Column 22, Line 14, delete ""MGR'," and insert -- "MGR", --, therefor.

In Column 22, Line 15, delete "704" and insert -- 704. --, therefor.

In the Claims

In Column 29, Line 22, in Claim 8, after "set" insert -- of --.

In Column 30, Line 21, in Claim 17, after "set" insert -- of --.

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*